United States Patent [19]

Dio et al.

[11] Patent Number: 4,981,670

[45] Date of Patent: Jan. 1, 1991

[54] HCN FROM CRUDE ACETO

[75] Inventors: Susan Dio, Port Lavaca, Tex.; Paul Wachtendorf, Lodi, Ohio

[73] Assignee: BP America Inc., Cleveland, Ohio

[21] Appl. No.: 451,477

[22] Filed: Dec. 15, 1989

[51] Int. Cl.$^5$ .............................................. C01C 3/02
[52] U.S. Cl. ................................................... 423/376
[58] Field of Search ........................................ 423/376

[56] References Cited

U.S. PATENT DOCUMENTS

| | | | |
|---|---|---|---|
| 2,531,287 | 11/1950 | Merrill et al. | 423/376 |
| 3,516,789 | 6/1970 | Sennewald et al. | 423/376 |
| 3,658,471 | 4/1972 | Sperka et al. | 423/376 |
| 3,911,089 | 10/1975 | Shiraishi et al. | 423/376 |
| 4,164,552 | 8/1979 | Weigert | 423/376 |
| 4,387,081 | 6/1983 | Voight et al. | 423/376 |
| 4,457,905 | 7/1984 | Ebner | 423/376 |
| 4,461,752 | 6/1984 | Sasaki et al. | 423/376 |
| 4,485,079 | 11/1984 | Brazdil et al. | 423/376 |
| 4,511,548 | 4/1985 | Attig et al. | 423/376 |
| 4,521,395 | 6/1985 | Kuechler et al. | 423/376 |
| 4,536,483 | 8/1985 | Sasaki et al. | 502/20 |
| 4,600,541 | 7/1986 | Aoki et al. | 558/321 |
| 4,869,889 | 9/1989 | Sherwin et al. | 423/373 |

FOREIGN PATENT DOCUMENTS

| | | | |
|---|---|---|---|
| 2014523 | 4/1970 | France | 423/376 |
| 125999 | 11/1978 | Japan | 423/376 |
| 53699 | 4/1979 | Japan | 423/376 |
| 71100 | 6/1979 | Japan | 423/376 |

Primary Examiner—Wayne A. Langel
Attorney, Agent, or Firm—Michael F. Esposito; David J. Untener; Larry W. Evans

[57] ABSTRACT

A process for producing hydrogen cyanide from gaseous acetonitrile comprising reacting the acetonitrile in the presence of an oxygen containing gas while in contact with an oxidation catalyst at an elevated temperature wherein the improvement comprises producing said gaseous acetonitrile from a mixture of crude acetonitrile and polymerization inhibiting agent.

13 Claims, No Drawings

HCN FROM CRUDE ACETO

BACKGROUND OF THE INVENTION

The present invention relates to a process for the preparation of hydrogen cyanide from acetonitrile. In particular, it relates to a process for preparing hydrogen cyanide from crude acetonitrile produced during the manufacture of an unsaturated nitrile such as acrylonitrile.

As is well known, hydrogen cyanide is an important substance which is frequently employed as a starting material for various organic reactions, and its consumption is expected to increase more and more.

Industrially, hydrogen cyanide has been mainly produced by ammoxidation of methane and is also obtained as a co-product in the preparation of acrylonitrile by the catalytic ammoxidation of propylene in the well known Sohio Acrylonitrile Process developed by the assignees of the instant application.

U.S. Pat. No. 3,516,789 discloses a process for the manufacture of hydrogen cyanide by reacting acetonitrile over an ammoxidation catalyst. The preferred procedure of this patent is the reaction of the acetonitrile produced during the manufacture of acrylonitrile by recycling the acetonitrile through the ammoxidation reactor over the ammoxidation catalyst. Moreover, U.S. Pat. No. 3,911,089 discloses the preparation of hydrogen cyanide by the addition of methanol to the ammoxidation reactor using the production of acrylonitrile to further increase the yield the hydrogen cyanide. Both of these patents have disadvantages which are overcome by the process of the present invention.

SUMMARY OF THE INVENTION

It is the primary object of the present invention to provide an economical process for the production of hydrogen cyanide from crude acetonitrile which has been vaporized.

It is a further object of the present invention to provide a process for the production of hydrogen cyanide from crude acetonitrile obtained as a coproduct from an acrylonitrile plant.

The term "crude acetonitrile" as used in this application means liquid acetonitrile containing various impurities and water. One of these impurities should be HCN which is usually present in amounts no greater than 2% by weight.

Additional objects and advantages of the invention will be set forth in part in the description that follows and in part will be obvious from the description or may be learned by practicing the invention. The objects and advantages of the invention may be realized and attained by means of instrumentalities and combinations particularly pointed out in the appended claims.

To achieve the foregoing objects and in accordance with the purposes of the invention as embodied and broadly described herein, the process of the present invention comprises manufacturing hydrogen cyanide from gaseous acetonitrile comprising reacting the acetonitrile in the presence of an oxygen containing gas in contact with an oxidation/ammoxidation catalyst at an elevated temperature wherein the improvement comprises producing said gaseous acetonitrile from a mixture of crude acetonitrile and a polymerization inhibiting agent.

In a further preferred embodiment, the process of producing hydrogen cyanide of the present invention comprises mixing a polymerization inhibiting agent with crude acetonitrile to form a mixture heating said mixture to a temperature sufficient to vaporize said acetonitrile, feeding the vaporized acetonitrile into a fluid bed reactor containing an oxygen containing gas and an oxidation/ammoxidation catalyst to produce hydrogen cyanide, and recovering the hydrogen cyanide.

DETAILED DESCRIPTION OF THE INVENTION

Reference will now be made in detail to the present preferred embodiments of the invention.

While the invention will be described in connection with the preferred embodiments, it will be understood that it is not intended to limit the invention to that embodiment. On the contrary it is intended to cover all alternatives, modifications and equivalents as may be included within the scope of the invention defined by the appended claims.

The process of the present invention is directed to the production to hydrogen cyanide from crude acetonitrile. In particular, the process comprises catalytically reacting gaseous acetonitrile at an elevated temperature over an oxidation/ammoxidation catalyst in the presence of an oxygen containing gas to produce hydrogen cyanide wherein the improvement comprises producing said gaseous acetonitrile from a mixture of crude acetonitrile and a polymerization inhibiting agent.

The crude acetonitrile can be obtained from any conventional source. However, in the preferred embodiment of the present invention the crude acetonitrile is a coproduct of an acrylonitrile plant and comprises acetonitrile/water azeotrope containing impurities which must include HCN. Normally, the level of HCN impurity in the crude acetonitrile is no greater than 2 weight percent. Typically, this acetonitrile/water azeotrope contains between 50-60% acetonitrile.

The preferred process for producing the gaseous acetonitrile is by heating the crude acetonitrile in a vaporization/superheater unit. Prior to the feeding the crude acetonitrile to the vaporization unit for vaporization of the acetonitrile a polymerization inhibiting agent is added to the crude acetonitrile to prevent or substantially minimize the fouling problems which occur during vaporization. It has been found that the HCN in the crude acetonitrile even at the impurity level creates fouling problems in the vaporization unit due to polymerization. The addition of the polymerization inhibiting agent prevents the HCN impurity from polymerizing and substantially eliminated fouling of the vaporization unit. Typically, organic acids are used as the polymerization inhibiting agent. In particular, carboxylic organic acids such as glycolic acid and acetic acid.

The crude acetonitrile is heated to a temperature sufficient to vaporize the acetonitrile in the vaporization/superheater unit (approximately 110-130° C.) followed by superheating to about 135-140° C. in the superheater unit. Any conventional vaporization/superheater unit may be utilized in the practice of the present invention.

In a further preferred embodiment of this aspect of the present invention a slipstream of unvaporized organics (10-25% by weight of the feed stream going into the vaporizing unit) is taken out of the vaporization/superheater unit to help further reduce potential fouling of the system and allowing for the maintenance of a constant reactor feed composition going into the reactor.

The superheated gaseous acetonitrile is then introduced into a fluid bed reactor where it is mixed with an oxygen containing gas (preferably air) and brought into contact with an oxidation catalyst. In a further modification to the process of the present invention an inert gas such as nitrogen can be used to dilute the reactant feeds into the reactor. The gaseous acetonitrile catalytically reacts in the reactor as it passes over the oxidation-/ammoxidation catalyst to produce hydrogen cyanide which is subsequently recovered from the reactor by conventional means (e.g., condensation).

In a preferred aspect of the process of the present invention the hydroen cyanide which is produced in the reactor is recovered as an overhead from the reactor and is fed directly into an ongoing acrylonitrile process plant for recovery of the HCN and recycled of unreacted acetonitrile.

The vaporization/superheater unit is operated at an elevated temperature between 110-140° C. and also at an elevated pressure of between 12-25 psig. Preferably the temperature range for vaporization is between 125-130° C. and superheating of the acetonitrile vapors in the vaporization takes place at about 135-140° C. The pressure range is between 15-35 psig, preferably being 20-30 psig, especially preferred being 25-30 psig..

The polymerization inhibiting agent, as stated previously, is added to prevent or substantially eliminate the polymerization of the HCN impurity in the crude acetonitrile. The organic carboxylic acid utilized in a preferred embodiment of the invention controls the pH of the liquid feed to the vaporization unit which prevents polymerization thereby alleviating fouling problems. In a preferred aspect of the present invention, the pH of the mixture fed to the vaporization unit should be between 4-6.5, preferably 5-6, especially preferred 5.5-5.8.

Typically, the vaporized acetonitrile entering into the fluid bed reactor is mixed with an oxygen containing as such as air in the reactor prior to contact with the catalyst. Conventional fluid bed reactors utilized in the practice of an acrylonitrile fluidized bed process are suitable in the practice on the present invention. Typically, the feed to the reactor is through a sparger system situated above the air grid in the fluid bed reactor. The oxidation catalyst utilized in the practice of the present invention is a bismuth-molybdenum-iron catalyst suitable for the ammoxidation of propylene to acrylonitrile. Typical of the types of catalysts utilized and practiced with this invention can be found in U.S. Pat. Nos. 3,642,930, 3,911,089 and 3,516,789.

In the practice of the present invention the ratio of air to feed (acetonitrile) into the reactor is typically between about 6:1 to about 8:1 on a molar basis. Preferably, the ratio of air to acetonitrile fed into the reactor is about 8:1.

The reaction is typically run at a temperature of between 300-550° C., preferably between 350-480° C. and a reactor can be run at atmospheric pressure or slightly elevated pressure such as that of between 10-20 psig, preferably 10-15 psig.

The WWH for the feed passing through the reactor can be between 0.01-0.07. Preferably, between 0.03-0.06, most preferably between 0.04 to 0.06. WWH is defined as wt wt/hr and is calculated by dividing the number of pounds of pure acetonitrile fed into the reactor by the total number of pounds of catalyst in the reactor. Typical contact time of the feed over the catalyst is between 1-20 seconds, preferably 8-15 seconds. A WVH of 0.1 or greater is not desired because as evidence by examples 13 and 14 below the possibility of temperature runaway in the reactor increases.

The following examples set forth in Table I are illustrative of the process of the present invention.

TABLE I

| Examples | Reactor Conditions | | | | | Selectivity | HCN PPC |
|---|---|---|---|---|---|---|---|
| | WWH | Cat. Change qms | Air/Aceto/N$_2$ | psig Pressure | Temp °C. | | |
| 1 | .045 | 550 | 8/1/1 | 12 | 420 | 30.3 | 19.8 |
| 2 | " | " | " | " | 440 | 27.4 | 21.8 |
| 3 | " | " | " | " | 460 | 23.2 | 20.9 |
| 4 | " | " | " | " | 480 | 18.2 | 16.7 |
| 5 | " | " | " | " | 460 | 39.0 | 25.4 |
| 6 | " | " | " | " | 480 | 33.7 | 24.9 |
| 7 | " | " | " | 18 | 480 | 29.0 | 21.3 |
| 8 | " | " | 6/1/1 | 12 | 460 | 37.1 | 26.1 |
| 9 | " | " | " | " | 480 | 33.4 | 25.0 |
| 10 | .075 | 400 | 8/1/1 | 18 | 480 | 38.0 | 25.5 |
| 11 | .100 | " | 10/1/1 | 10 | 450 | 50.8 | 18.6 |
| 12 | " | " | " | 18 | 450 | 49.2 | 24.8 |
| 13 | " | " | " | " | 480 | Temperature Runaway | |
| 14 | " | " | 8/1/1 | " | 480 | Temperature Runaway | |
| 15 | " | " | 6/1/1 | " | 480 | 39.5 | 23.7 |
| 16 | .045 | 550 | 8/1/1 | 12 | 460 | 3.2* | 2.5 |
| 17 | " | 550 | 8/1/1 | 12 | 480 | 3.1* | 2.3 |

All examples were conducted in 1½ fluid bed reactor with 60% Acetonitrile: 40% H$_2$O feed.
*Examples 16 and 17 were conducted with fresh oxidation/ammoxidation catalyst charge.

The improved process of the present invention enables one to take crude acetonitrile produced during the practice of the Sohio Acrylonitrile Process and by a simple treatment with a polymerization inhibiting agent allow one to vaporize the crude aceto and feed it directly into a fluid bed reactor to produce hydrogen cyanide. It has been found that the addition of the polymerization inhibiting agent prior to the vaporization of the crude acetonitrile eliminates the fouling which have been experienced in prior vaporization attempts. This simple addition of an organic acid to the crude acetonitrile provides an unexpected advantage of not only eliminating fouling but also providing for the unexpected destruction of a number of acrylonitrile contaminants. Moreover, the addition of a slipstream to remove unvaporized organics (10-20% weight of the feed stream) also eliminates or reduces potential for fouling of the system.

The process of the present invention results in an economic and commercially viable means of producing hydrogen cyanide from crude acetonitrile produced as a coproduct in the practice the Sohio Acrylonitrile Process.

What is claimed is:

1. A process for producing hydrogen cyanide from gaseous acetonitrile comprising reacting the acetonitrile in the presence of an oxygen containing gas while in contact with an oxidation/ammoxidation catalyst at an elevated temperature wherein the improvement comprises producing said gaseous acetonitrile from a mixture of crude acetonitrile contains Henasan impurity and a polymerization inhibiting agent which substantially eliminates the polymerization of the HCN impurity in the crude acetonitrile.

2. The process of claim 1 wherein the polymerization inhibiting agent is an organic carboxylic acid.

3. The process of claim 2 wherein said carboxylic acid is selected from the group consisting of glycolic acid and acetic acid.

4. The process of claim 1 wherein said gaseous acetonitrile is produced by heating said mixture of crude acetonitrile and polymerization inhibiting agent at an elevated pressure to a temperature sufficient to vaporize said acetonitrile.

5. The process of claim 4 comprising heating said mixture to a temperature of between about 110-135° C. to vaporize the acetonitrile and superheating said vapors to a temperature of between about 135-140° C.

6. The process of claim 4 wherein said elevated pressure during vaporization of said acetonitrile is between about 15-35 psig.

7. A process of producing hydrogen cyanide comprising:
    a. mixing a polymerization inhibiting agent with crude acetonitrile containing HCN as an impurity to form a mixture, said polymerization inhibiting agent substantially eliminating the polymerization of the HCN impurity in the crude acetonitrile;
    b. heating said mixture to a temperature sufficient to vaporize said acetonitrile; and
    c. feeding said vaporized acetonitrile into a fluid bed reactor contain an oxygen containing gas and an oxidation/ammoxidation catalyst to produce hydrogen cyanide.

8. The process of claim 7 wherein said polymerization inhibiting agent is an organic carboxylic acid.

9. The process of claim 8 wherein said carboxylic acid is selected from the group consisting of glycolic and acetic acid.

10. The process of claim 9 wherein the feed ratio of oxygen to acetonitrile entering the reactor is between 6:1 to 8:1.

11. The process of claim 10 wherein the WWH of the feed into the reactor is below 0.1.

12. The process of claim 7 wherein said heating is performed under an elevated pressure.

13. The process of claim 12 wherein said mixture is heated to about 110-130° C. to vaporize said acetonitrile followed by superheating said vapors to a temperature of about 135-140° C.

* * * * *

UNITED STATES PATENT AND TRADEMARK OFFICE
CERTIFICATE OF CORRECTION

PATENT NO. : 4,981,670

DATED : January 1, 1991

INVENTOR(S) : Susan Dio, Paul Wachtendorf

It is certified that error appears in the above-identified patent and that said Letters Patent is hereby corrected as shown below:

Col. 5, line 14, "Henasan" has been changed to --HCN as an --

Signed and Sealed this

Twelfth Day of May, 1992

Attest:

DOUGLAS B. COMER

Attesting Officer     Acting Commissioner of Patents and Trademarks